United States Patent
Tzeng

(10) Patent No.: US 7,236,456 B2
(45) Date of Patent: Jun. 26, 2007

(54) USING SHADOW MCAST/BCAST/DLF COUNTER AND FREE POINTER COUNTER TO BALANCE UNICAST AND MCAST/BCAST/DLF FRAME RATIO

(75) Inventor: Shrjie Tzeng, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1048 days.

(21) Appl. No.: 10/163,362

(22) Filed: Jun. 7, 2002

(65) Prior Publication Data

US 2003/0210650 A1 Nov. 13, 2003

Related U.S. Application Data

(60) Provisional application No. 60/378,666, filed on May 9, 2002.

(51) Int. Cl.
- H04L 12/26 (2006.01)
- H04J 3/14 (2006.01)
- G08C 15/00 (2006.01)
- G06F 11/00 (2006.01)
- G01R 31/08 (2006.01)

(52) U.S. Cl. .............. 370/230; 370/235; 370/389; 709/233

(58) Field of Classification Search ........ 370/229–236, 370/389–395, 401–417; 709/234–235
See application file for complete search history.

(56) References Cited

U.S. PATENT DOCUMENTS

| | | | | |
|---|---|---|---|---|
| 4,138,732 A | * | 2/1979 | Suzuki et al. ................. | 710/31 |
| 5,249,271 A | * | 9/1993 | Hopkinson et al. ........... | 710/57 |
| 5,604,867 A | * | 2/1997 | Harwood ..................... | 709/233 |
| 5,632,042 A | * | 5/1997 | Kuwabara et al. ............ | 712/26 |
| 5,898,687 A | | 4/1999 | Harriman et al. | |
| 6,061,351 A | | 5/2000 | Erimli et al. | |
| 6,118,761 A | * | 9/2000 | Kalkunte et al. ........... | 370/229 |
| 6,185,185 B1 | | 2/2001 | Bass et al. | |
| 6,252,849 B1 | * | 6/2001 | Rom et al. ................... | 370/230 |
| 6,385,170 B1 | * | 5/2002 | Chiu et al. ................... | 370/235 |
| 6,405,258 B1 | * | 6/2002 | Erimli et al. ............... | 709/235 |
| 6,762,995 B1 | * | 7/2004 | Drummond-Murray et al. .......................... | 370/229 |
| 6,918,005 B1 | * | 7/2005 | Marchant et al. ........... | 711/113 |
| 6,957,270 B1 | * | 10/2005 | Erimli et al. ............... | 709/235 |
| 6,981,054 B1 | * | 12/2005 | Krishna ...................... | 709/235 |
| 7,061,868 B1 | * | 6/2006 | Ahlfors et al. .............. | 370/236 |

* cited by examiner

*Primary Examiner*—Man U. Phan
(74) *Attorney, Agent, or Firm*—Squire, Sanders & Dempsey L.L.P.

(57) ABSTRACT

A network device for managing data flow can have at least one receiving port configured to receive data, a first counter configured to monitor at least one pointer, and a second counter configured to record the at least one pointer to correspond to the at least one receiving port therein when the data is a plural cast data, and the plural cast data is received in the at least one receiving port. In addition, the network device can include a control module configured to at least monitor the second counter with respect to the data flow of the network device.

34 Claims, 2 Drawing Sheets

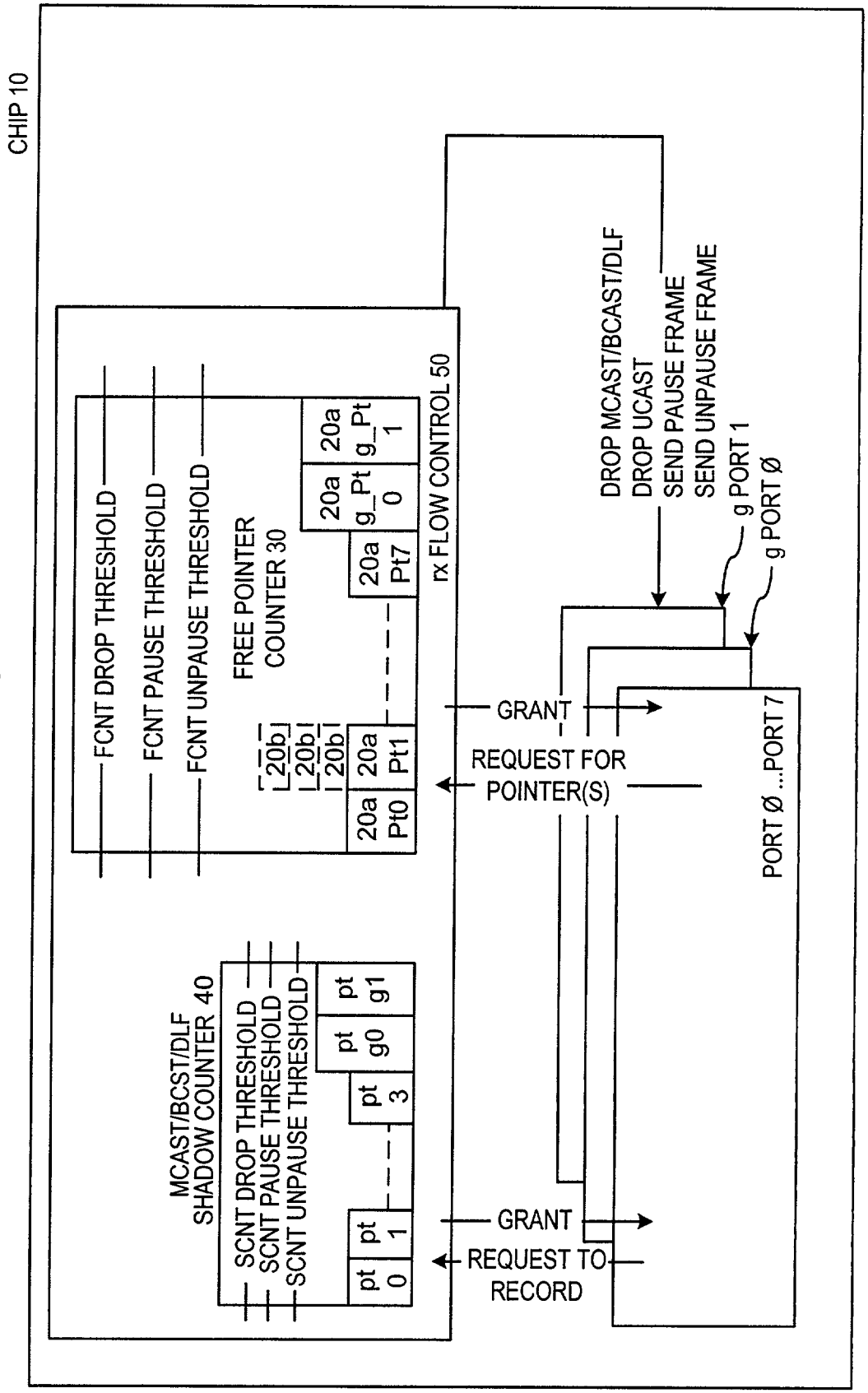

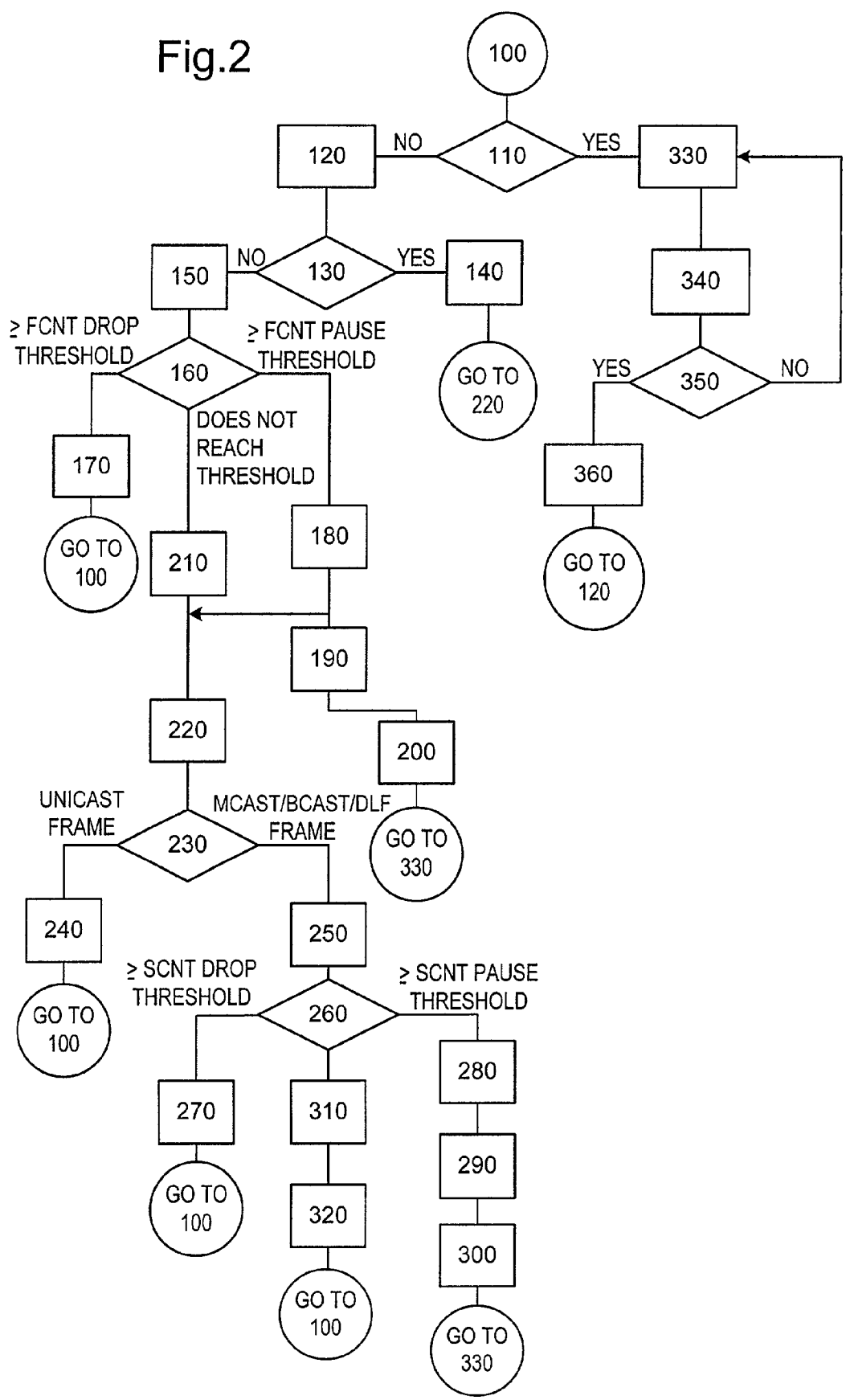

USING SHADOW MCAST/BCAST/DLF COUNTER AND FREE POINTER COUNTER TO BALANCE UNICAST AND MCAST/BCAST/DLF FRAME RATIO

CROSS REFERENCE TO RELATED APPLICATIONS

This application claims priority of U.S. Provisional Patent Applications Ser. No. 60/378,666, filed May 9, 2002. The contents of the provisional application is hereby incorporated by reference.

BACKGROUND OF THE INVENTION

1. Field of the Invention

The present invention relates to a method and an apparatus for managing data flow in a network communication environment such as Ethernet, Fast Ethernet and Gigabit Ethernet environments. In particular, the present invention relates to a network device for managing data flow based on a receiving-side flow control scheme. The network device of the invention can be implemented on a semiconductor substrate such as a silicon chip. The present invention also relates to a method of managing data flow based on a receiving-side flow control scheme which can be implemented on a semiconductor substrate or in a software application, or a combination of both.

2. Description of the Related Art

High speed networking devices, such as switches and switching systems, are becoming more significant in the communication network environment, and therefore are in great demand. As the amount of data and communication between network devices increases, so does the possibility of data congestion on the network. For example, when multiple consecutive bursts of large data packets are received at a destination device on the network, congestion of data flow can occur which can significantly slow down the traffic and flow of information. Accordingly, fair and efficient data flow control and management systems are important in minimizing or possibly eliminating such data congestion.

SUMMARY OF THE INVENTION

One example of the present invention can provide a method of managing data flow. The method can include the steps of requesting for at least one pointer in a first counter from at least one receiving port in a network device, and recording the at least one pointer in a second counter when at least one plural cast frame is received in the at least one receiving port. In addition, the method can include the step of monitoring the second counter with respect to the data flow in the network device.

In another example, the present invention can relate to a network device for managing data flow. The network device can include at least one receiving port configured to receive data, and a first counter configured to monitor at least one pointer. Furthermore, the network device can include a second counter configured to record the at least one pointer to correspond to the at least one receiving port therein when the at least one receiving port receives the data comprising a plural cast frame, and a control module configured to at least monitor the second counter with respect to the data flow of the network device.

In yet another example, the present invention can provide a system for managing data flow. The means for managing data flow can have a means for requesting at least one pointer in a first counter from at least one receiving port in a network device, a means for recording the at least one pointer in a second counter when at least one plural cast frame is received in the at least one receiving port, and a means for monitoring the second counter with respect to the data flow in the network device.

BRIEF DESCRIPTION OF THE DRAWINGS

For proper understanding of the invention, reference should be made to the accompanying drawings, wherein:

FIG. 1 illustrates one example of a configuration for managing data flow according to the present invention; and FIG. 2 illustrates a flow chart illustrating one example of a method of managing data flow according to the present invention.

DETAILED DESCRIPTION OF THE PREFERRED EMBODIMENT(S)

FIG. 1 illustrates one example of a hardware configuration that can manage data flow based on a receiving-side flow control scheme in a network device, such as a switch or a switching chip, in accordance with the present invention. The example shown in FIG. 1 can manage data flow by having a shadow multicast/broadcast/destination-lookup-failure counter, also referred to as mcast/bcast/dlf shadow counter, and a free pointer counter to balance unicast and multicast/broadcast/destination-lookup-failure, mcast/bcast/dlf, data ratio in a network device. The hardware configuration of FIG. 1 can be in an integrated, modular and single chip solution, and therefore can be embodied on a semiconductor substrate, such as silicon. Alternatively, the hardware configuration of FIG. 1 can be embodied in a plurality of discrete components on a circuit board.

The configuration as shown in FIG. 1, illustrates a chip 10 which can have a plurality of ports, such as port 0–port 7, and gports 0 & 1. In this example, the chip 10 can have 8 fast Ethernet ports port 0-port 1, 2 Gigabit ports gports 0 & 1 with one expansion port that can chain other chips together (expansion port not shown). Furthermore, the chip 10 can include an embedded frame buffer memory (also not shown) with a plurality of pointers ptr 20 that represent or point to a particular location or section in the frame buffer memory.

It is noted that the frame buffer memory can be any size, and each pointer can represent any section of the entire buffer memory. For instance, the frame buffer memory can contain 256K byte of embedded buffer memory, and each pointer can represent 256 byte of buffer memory. Accordingly, there can be 1000 pointers to represent 256K byte of buffer memory.

Each port can be a receiving port as well as a transmitting port and can receive as well as transmit data, respectively. The data received and transmitted, based on the present invention, can be in any data format configured for a network environment. For instance, the data can be in the format of a data packet, a data frame, or a data cell. Moreover, the data discussed herein can be, at least, a unicast frame, a multicast frame, a broadcast frame, or a destination-lookup-failure frame. A unicast frame can be a data frame that is relayed to one known destination port. In contrast, a plural cast frame can be a data frame that is relayed to a plurality of known destination ports. For instance, a multicast frame can be a plural cast frame that is relayed to a plurality of known destination ports, and a broadcast frame can also be a plural cast frame that is relayed to all the ports except for the receiving ports.

In addition, a dlf frame can also be a plural cast frame that is relayed to all ports except for the receiving ports. For instance, if a port receives a unicast frame or a multicast frame, the present invention can perform a destination address (DA) lookup to determine the destination port for that unicast frame, or the destination ports for that multicast data. If the DA lookup is successful, such as if the DA lookup finds a match, then the present invention can know a single destination port to relay the unicast frame, and a plurality of destination ports to relay the multicast frame. If on the other hand, the DA lookup is not successful, such as if the DA lookup does not find a match, then a destination-lookup-failure, or a dlf can occur. Therefore, a dlf frame can be a unicast frame or a multicast frame in which a dlf situation has occurred with respect these frames. Accordingly, if a dlf situation occurs with respect to a data frame, the data frame can be treated as a dlf frame and the present invention can relay the dlf frame to all the ports with the exception of the receiving ports.

The chip 10 of FIG. 1 can also contain a free pointer counter 30, also referred to as a free buffer pointer counter, and a mcast/bcast/dlf shadow counter 40, wherein each counter can be coupled to a receiving flow control module rx flow control 50.

The free pointer counter 30 can monitor a number of pointers 20 that correspond to each port. In this example of the present invention, the free pointer counter 30 can monitor a number of pointers 20 for port 0–port 7, and gports 0 and 1. In particular, the free pointer counter 30 can monitor a number of reserved pointers 20a reserved for each port and a number of free buffer pointers 20b from a free pointer pool for each port. Additionally, the free pointer counter 30 can grant or allocate the reserved pointers 20a and/or the free buffer pointers 20b to a receiving port requesting for pointers. The free pointer counter 30 can also count the number of pointers 20 granted or allocated to each and every port.

Moreover, the free pointer counter 30 can be configured to have a plurality of thresholds for controlling or managing the data flow of data frames. In this example, the free pointer counter 30 can be configured to have a plurality of pointer thresholds which can monitor the number of pointers for each port. Each threshold within the free pointer counter 30 can be preprogrammed with a predetermined value or at a predetermined setting. In this example, the free pointer counter 30 can be configured to have three pointer thresholds, them being a fcnt drop threshold, a fcnt pause threshold, and a fcnt un-pause threshold preprogrammed therein wherein each threshold has a preprogrammed predetermined value. In addition, the three pointer thresholds can be configured to have three separate threshold values, or to have any two or three thresholds having the same threshold value.

Also shown in FIG. 1, the mcast/bcast/dlf shadow counter 40 can also monitor a number of pointers 20 that correspond to each port. In this example of the present invention, the mcast/bcast/dlf shadow counter 40 can monitor a number of pointers 20 that represent mulitcast frames, broadcast frames, and dlf frames, for port 0–port 7, and gports 0 and 1. In particular, mcast/bcast/dlf shadow counter 40 can record and count a number of mcast/bcast/dlf frame pointers for each and every port.

Moreover, mcast/bcast/dlf shadow counter 40 can be configured to also have a plurality of thresholds for controlling or managing the data flow of data frames. In this example, mcast/bcast/dlf shadow counter 40 can be configured to have a plurality of mcast/bcast/dlf pointer thresholds which can monitor the number of mcast/bcast/dlf pointers for each and every port. Each threshold within the mcast/bcast/dlf shadow counter 40 can be preprogrammed with a predetermined value or at a predetermined setting. In this example, the mcast/bcast/dlf shadow counter 40 can be configured to have three mcast/bcast/dlf pointer thresholds, them being a scnt drop threshold, a scnt pause threshold, and a scnt un-pause threshold preprogrammed therein, wherein each threshold has a preprogrammed predetermined value. In addition, the three mcast/bcast/dlf pointer thresholds can be configured to have three separate threshold values, or to have any two or three thresholds having the same threshold value. Furthermore, mcast/bcast/dlf pointer thresholds in the mcast/bcast/dlf shadow counter 40 can be preprogrammed to have any ratio relationship with the free pointer counter 30 and the thresholds therein. For instance, the mcast/bcast/dlf pointer thresholds can be preprogrammed to have a mcast/bcast/dlf pointer threshold to a free pointer threshold ratio of 1:16.

Coupled to the free pointer counter 30 and the mcast/bcast/dlf shadow counter 40 can be a rx flow control 50, as shown in FIG. 1. The rx flow control 50 can perform a plurality of actions, tasks and/or functions. In this example, the rx flow control 50 can monitor the count or queuing logic of the pointers in either the mcast/bcast/dlf counter 40 or the free pointer counter 30, or both. The rx flow control 50 can also be configured to interact with each port, such as sending instructions to or receiving instructions from or implementing tasks or actions with respect to the ports. For instance, the flow control module 50 can receive requests from the ports, and/or can transmit instructions to the ports, such as instructions to a drop a data frame, to send out pause or un-pause frames.

FIG. 2 illustrates one example of a method of managing data flow based on a receiving-side flow control scheme, in accordance with the present invention. The method of the invention can be implemented in hardware, or software, or a combination of both hardware and software.

According to this example, a mcast/bcast/dlf shadow counter 40 and a free pointer counter 40, each monitors a number of pointers therein to balance the data flow ration of unicast frames and mcast/bcast/dlf frames.

At step 100 of FIG. 2, at least one receiving port has data frame being sent to that port. The at least one receiving port can receive the data frame provided that a pause condition is not in force with respect to that receiving port. In other word, at step 110, if there is no pause condition in the receiving port, then the receiving port can receive the data frame. Before receiving the data frame, the receiving port, at step 120, can request for at least one pointer 20, yet can be more than one pointers 20, corresponding to the receiving port from the free pointer counter 30. The rx flow control 50 together with the free pointer counter 50 can determine at step 130 the availability of the reserved buffer pointer 20a for the receiving port. In other words, a determination is made at step 30 if there is any available reserved buffer pointer(s) 20a reserved for the receiving port to satisfy the request for a pointer from the receiving port. If at least one reserved buffer pointer is available to satisfy the request, then at step 140, the rx flow control 50 and the free counter pointer 50 can grant the reserved buffer pointer 20a to the receiving port, and the free counter pointer 50 can be updated with respect to the availability of the reserved pointers 20a for that receiving port. Thereafter, the data frame is received at the receiving port which is discussed further below.

On the other hand, if there is no availability of reserved buffer pointers 20*a* reserved for the receiving port, then at step 150, the present invention can look to free buffer pointers 20*b* from a free pointer pool in the free pointer counter 30. The request for at least one pointer can prompt the free pointer counter 30 to assess the request with respect to the free pointer counter thresholds therein. In other words, at step 160, the request for a free buffer pointer 20*b* can prompt the free pointer counter 30 to compare the total number of pointers 20 corresponding to the requesting/receiving port, including the pointer(s) requested, against a fcnt drop threshold, and a fcnt pause threshold. If the total number of pointers 20 corresponding to the requesting/receiving port, including the pointer(s) requested, equals to or is greater than the fcnt drop threshold, then step 170 drops the data frame when it is received. In the alternative, if the data frame has not yet been received by the port, then the data frame will not need to be dropped.

Alternatively, if at step 160 the total number of pointers 20 corresponding to the requesting/receiving port, including the pointer(s) requested, equals to or is greater than the fcnt pause threshold, step 180 of FIG. 2 can grant the request and allocate a free buffer pointer 20*b* to the requesting/receiving port, and send an instruction to the requesting/receiving port to send out a pause frame. The free pointer counter 30 can be update with respect to the availability of the free buffer pointers and other pointer information with respect to each port in step 190. In addition, at step 200, the rx flow control 50 can instruct the receiving port to send a pause frame to pause the receipt of data frames in that port. After granting the request for at least one pointer, the receiving port can receive the data frame and the method of handling the data frame can continue at step 220 discussed in detail below.

If however, at step 160 the total number of pointers 20 corresponding to the requesting/receiving port, including the requested pointer(s), does not equals to or is not greater than the fcnt drop threshold and the fcnt pause threshold, then the free pointer counter 30 at step 210 can grant the requested pointer(s) to the requesting receiving port; and at step 220 the requesting/receiving port can receive the data frame in the port. Also at step 220, the received data frame can be buffered in the frame buffer memory at the section(s) or location(s) represented by the granted free pointer(s) 20*b*.

Further shown in FIG. 2, step 230 of the present invention distinguishes whether the data frame received is either a unicast frame with a successful destination-lookup, or a plural cast frame, the plural cast frame comprising of a multicast frame, a broadcast frame and a dlf frame, which includes an unicast destination-lookup failure frame. If the data frame is a unicast destination-lookup succeed frame, then the receiving port does not request to record the pointer(s) granted from the free pointer counter 30 at step 240, and the unicast frame is relayed to the destination port at line speed. If however the data frame is either a mcast/bcast/dlf frame, then the receiving port can request the rx flow control 50 and a mcast/bcast/dlf shadow counter 40 to record the pointer(s) granted from the free pointer counter 30 into the mcast/bcast/dlf shadow counter 40 with respect to the requesting port. This request can be made at step 250 of FIG. 2. At step 260 of the present example, the request to record the pointer(s) 20 can prompt the mcast/bcast/dlf shadow counter 40 to compare a total number of pointers 20 corresponding to the requesting/receiving port, including the pointer(s) requested for recording, against a scnt drop threshold, and a scnt pause threshold therein. If at step 260 the total number of pointers 20 corresponding to the requesting/receiving port, including the pointer(s) requested for recording, equals to or is greater than the scnt drop threshold, then step 270 drops the data frame.

Alternatively, if at step 260 the total number of pointers 20 corresponding to the requesting/receiving port, including the pointer(s) requested for recording, equals to or is greater than the scnt pause threshold, step 280 of FIG. 2 can grant the request and record the buffer pointer 20 corresponding to the requesting/receiving port, and the rx flow control 50 can instruct the requesting/receiving port to send out a pause frame. The mcast/bcast/dlf shadow counter 40 can update the count of the buffer pointers 20 with respect to each port in step 290. In addition, at step 300, the rx flow control 50 can instruct the receiving/requesting port to send a pause frame to pause the receipt of all data frames in that port.

If however, at step 260 the total number of pointers 20 corresponding to the requesting/receiving port, including the pointer(s) requested to be recorded, does not equals to or is not greater than the scnt drop threshold and the scnt pause threshold, then the mcast/bcast/dlf shadow counter 40 at step 310 can grant the requested to record the buffer pointer(s) 20; and at step 320 the mcast/bcast/dlf shadow counter 40 can update the count of the buffer pointer(s) recorded therein. Subsequently, the buffered mcast/bcast/dlf frame can be relayed to the destination port at line speed.

Returning to step 110 of FIG. 2, if there is no pause condition in the receiving port, then the receiving port can receive the data frame. However, if a pause condition is in force with respect to a particular port, then at step 330 the particular port will not receive further data frames therein. At step 340, the rx flow control 50 together with the free pointer counter 30 and the mcast/bcast/dlf shadow counter 40 can monitor the pointer count with respect to each port in both the free pointer counter 30 and the mcast/bcast/dlf shadow counter 40, as the data frame is transmitted out at line speed. The pointer count in each counter 30 and counter 40 is compared against the fcnt un-pause threshold and the scnt un-pause threshold, respectively therein.

The comparison can be made at step 350 of FIG. 2. In other words, the free pointer counter 30 and the mcast/bcast/dlf shadow counter 40 are monitored so that when the pointer count for any receiving port falls below or is less than the fcnt un-pause threshold and the sent un-pause threshold, the rx flow control 50 at step 360 can instruct the corresponding port to send an un-pause frame and resume receiving data frames therein. If however, the pointer count for any receiving port does not falls below or is not less than the fcnt un-pause threshold or the scnt un-pause threshold, then the pause condition can still be in force.

The above-disclosed configuration of the present invention can be embodied in a hardware configuration such as a semiconductor substrate. Furthermore, the methods of the invention can be implemented in hardware, or software, or a combination of both hardware and software. In addition, a person of skill in the art with respect to semiconductor design and manufacturing would be able to implement the various elements and methods of the present invention onto a single semiconductor substrate, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method of managing data flow, the method comprising:
   requesting for at least one pointer in a first counter from at least one receiving port in a network device;
   recording the at least one pointer in a second counter when at least one plural cast frame is received in the at least one receiving port;
   monitoring the second counter with respect to the data flow in the network device; and
   granting at least one reserved pointer reserved for the at least one receiving port when available.

2. The method of claim 1, wherein the requesting for the at least one pointer further comprises:
   requesting for at least one buffer pointer such that the buffer pointer represents a section of a frame buffer memory in the network device.

3. The method of claim 2, wherein the requesting for the at least one buffer pointer further comprises:
   Requesting for at least one reserved buffer pointer reserved for the at least one receiving port.

4. The method of claim 2, wherein the requesting for the at least one buffer pointer further comprises:
   requesting for at least one free buffer pointer from a free pointer pool in the first counter.

5. The method of claim 1, further comprising:
   granting at least one free pointer from a free pointer pool when the at least one reserved pointer is unavailable, and when a total number of pointers corresponding to the at least one receiving port in the first counter is less than a threshold in the first counter.

6. The method of claim 1, wherein the recording further comprises:
   recording the at least one pointer to a second counter when the plural cast frame is buffered in a section of a frame buffer memory, wherein the section is represented by the at least one pointer.

7. The method of claim 6, wherein the recording further comprises:
   recording the at least one pointer in the second counter when a total number of recorded pointers corresponding to the at least one receiving port in the second counter is less than a first threshold in the second counter.

8. The method of claim 7, wherein the recording further comprises:
   Recording the at least one pointer in the second counter when the total number of recoded pointers corresponding to the at least one receiving port in the second counter equals to or is less than a second threshold in the second counter, and when the at least one receiving port is receiving the plural cast frame.

9. The method of claim 8, wherein the recording further comprises:
   recording the at least one pointer in the second counter wherein the plural cast frame comprises a multicast frame, a broadcast frame and a destination-lookup-failure frame.

10. The method of claim 1, wherein the monitoring further comprises:
    sending a first instruction with respect to the plural cast frame to the at least one receiving port when a second number of total recorded pointers recorded in the second counter with respect to the at least one receiving port equals to or is greater than a first threshold in the second counter.

11. The method of claim 10, wherein the monitoring further comprises:
    sending a second instruction with respect to the plural cast frame to the at least one receiving port when the second number of total recorded pointers recorded in the second counter with respect to the at least one receiving port equals to or is less than a second threshold in the second counter, and when a first number of total recorded pointers recorded in the first counter with respect to the at least one receiving port equals to or is less than a third threshold in the first counter, and when the first instruction is in force.

12. The method of claim 11, wherein the monitoring further comprises:
    dropping the plural cat frame when the second number of total recorded pointes recorded in the second counter with respect to the at least one receiving port equals to or is greater than a fourth threshold in the second counter.

13. A network device for managing data flow, said network device comprising:
    at least one receiving port configured to receive data;
    a first counter configured to monitor at least one pointer;
    a second counter configured to record the at least one pointer to correspond to the at least one receiving port therein when the at least one receiving port receives the data comprising a plural cast frame; and
    a control module configured to at least monitor the second counter with respect to the data flow of the network device,
    wherein the control module is configured to send a first instruction with respect to the plural cast frame to the at least one receiving port when a second number of total recorded pointers recorded in the second counter with respect to the at least one receiving port equals to or is greater than a first threshold in the second counter.

14. The network device of claim 13, wherein the control module is configured to send a second instruction with respect to the plural cast frame to the at least one receiving port when the second number of total recorded pointers recorded in the second counter with respect to the at least one receiving port equals to or is less than a second threshold in the second counter, and a first number of total recorded pointers recorded in the first counter with respect to the at least one receiving port equals to or is less than a third threshold in the first counter, and when the first instruction is in force.

15. The network device of claim 14, wherein the control module is configured to drop the plural cast frame when the second number of total recorded pointers recorded in the second counter with respect to the at least one receiving port equals to or is greater than a fourth threshold in the second counter.

16. The network device of claim 13, wherein the at least one receiving port is configured to request for the at least one pointer.

17. The network device of claim 13, wherein the first counter is configured to grant the at least one pointer, the at least one pointer comprises one reserved buffer pointer reserved for the at least one receiving port, when available.

18. The network device of claim 17, wherein the first counter is configured to grant the at least one pointer, the at least one pointer comprises one free buffer pointer from a free pointer pool when the at least one reserved buffer pointer is not available, and when a total number of pointers corresponding to the at least one receiving port is less than a threshold therein.

19. The network device of claim 13, wherein the second counter is configured to record the at least one pointer when the plural cast frame is buffered in a buffer memory, the at least one pointer represents a section of the buffer memory.

20. The network device of claim 19, wherein the second counter is configured to record the at least one pointer when a total number of pointers recorded therein with respect to the at least one receiving port is less than a first threshold therein.

21. The network device of claim 20, wherein the second counter is configured to record the at least one pointer when the total number of pointers recorded therein with respect to the at least one receiving port equals to or is less than a second threshold therein, and when the at least one receiving port is receiving the plural cast frame.

22. The network device of claim 21, wherein the second counter is configured to record the at least one pointer wherein the plural cast frame comprises a multicast frame, a broadcast frame and a destination-lookup-failure frame.

23. A system for managing data flow, said system comprising:
a means for requesting at least one pointer in a first counter from at least one receiving port in a network device;
a means for recording the at least one pointer in a second counter when at least one plural cast frame is received in the at least one receiving port;
a means for monitoring the second counter with respect to the data flow in the network device; and
a means for granting at least one reserved pointer reserved for the at least one receiving port when available.

24. The system of claim 23, wherein the means for requesting requests for at least one buffer pointer such that the buffer pointer represents a section of a frame buffer memory in the network device.

25. The system of claim 24, wherein the means for requesting requests for at least one reserved buffer pointer reserved for the at least one receiving port.

26. The system of claim 24, wherein the means for requesting requests for at least one free buffer pointer from a free pointer pool in the first counter.

27. The system of claim 23, further comprising:
a means for granting at least one free pointer from a free pointer pool when the at least one reserved pointer is unavailable, and when a total number of pointers corresponding to the at least one receiving port in the first counter is less than a threshold in the first counter.

28. The system of claim 23, wherein the means for recording records the at least one pointer in a second counter when the at least one plural cast frame is buffered in a section of a frame buffer memory, wherein the section is represented by the at least one pointer.

29. The system of claim 28, wherein the means for recording records the at least one pointer in the second counter when a total number of recorded pointes corresponding to the at least one receiving port in the second counter is less than a first threshold in the second counter.

30. The system of claim 29, wherein the means for recording records the at least one pointer in the second counter when the total number of recorded pointers corresponding to the at least one receiving port in the second counter equals to or is less than a second threshold in the second counter, and when the at least one receiving port is receiving the plural cast frame.

31. The system of claim 30, wherein the means for recording records the at least one pointer in the second counter wherein the plural cast frame comprise a multicast frame, a broadcast frame and a destination-lookup-failure frame.

32. The system of claim 23, wherein the means for monitoring further comprises:
a means for sending a first instruction with respect to the plural cast frame to the at least one receiving port when a second number of total recorded pointers recorded in the second counter with respect to the at least one receiving port equals to or is greater than a first threshold in the second counter.

33. The system of claim 32, wherein the means for monitoring further comprises:
a means for sending a second instruction with respect to the plural cast frame to the at least one receiving port when the second number of total recorded pointers recorded in the second counter with respect to the at least one receiving port equals to or is less than a second threshold in the second counter, and when a first number of total recorded pointers recorded in the first counter with respect to the at least one receiving port equals to or is less than a third threshold in the first counter, and when the first instruction is in force.

34. The system of claim 33, wherein the means for monitoring further comprises:
a means for dropping the plural cast frame when the second number of total recorded pointers recorded in the second counter with respect to the at least one receiving port equals to or is greater than a fourth threshold in the second counter.

* * * * *